Jan. 6, 1931.  P. R. BASSETT  1,788,142
PROJECTOR
Filed May 12, 1927   2 Sheets-Sheet 1
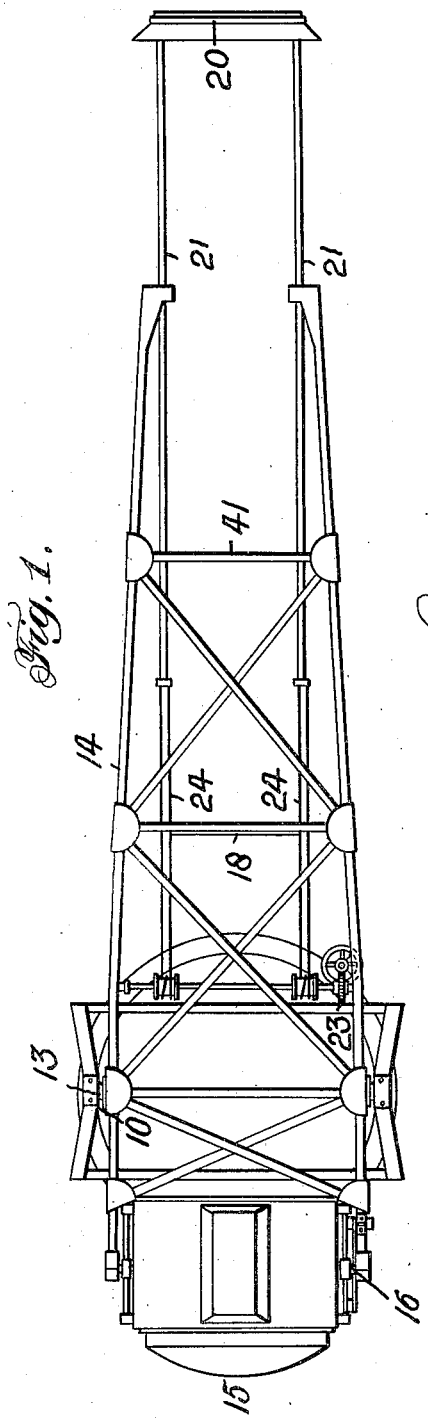
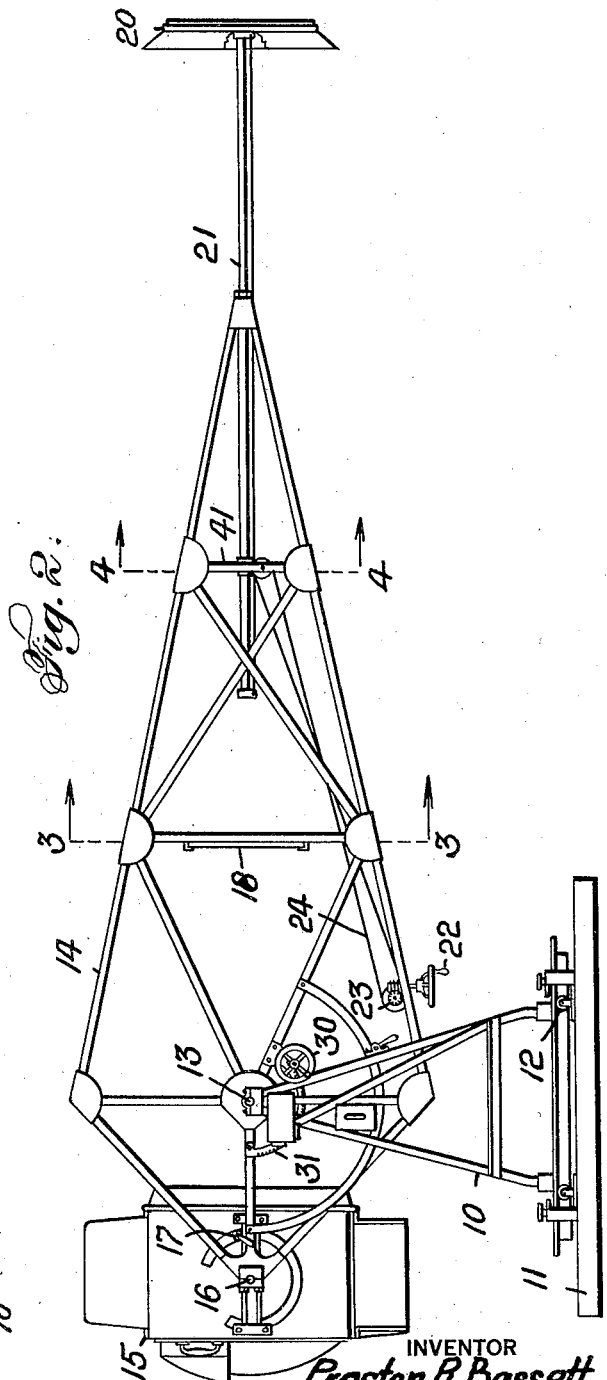
INVENTOR
*Preston R. Bassett.*
BY
*Herbert H. Thompson*
his ATTORNEY.

Jan. 6, 1931.　　　P. R. BASSETT　　　1,788,142
PROJECTOR
Filed May 12, 1927　　2 Sheets-Sheet 2
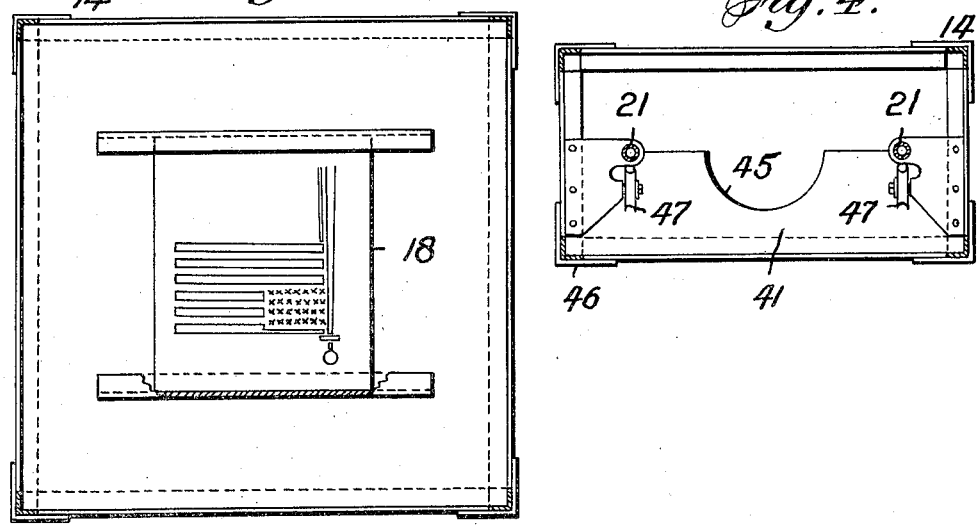
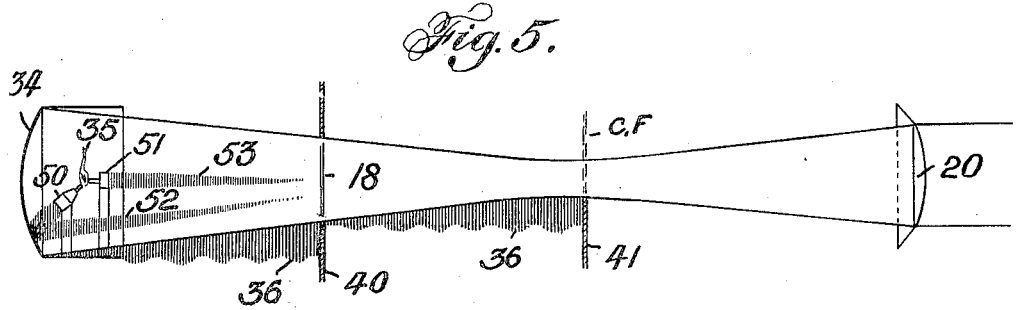
INVENTOR
Preston R. Bassett.
BY
Herbert H. Thompson
his ATTORNEY.

Patented Jan. 6, 1931

1,788,142

UNITED STATES PATENT OFFICE

PRESTON R. BASSETT, OF ROCKVILLE CENTER, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

PROJECTOR

Application filed May 12, 1927. Serial No. 190,676.

This invention relates to projectors for the purpose of projecting an image with sufficient intensity at distances of from 1,000 to 20,000 feet or more, so that the image may be seen on clouds, layers of mist, cliffs, buildings, or any other object of sufficient size at such distances from the projector.

In order to obtain sufficient light to project an image through such distances, it is necessary to employ a powerful source of light, such as a high intensity searchlight. Several serious problems arise, however, in the use of high intensity searchlights for such purposes. In the first place the tail flame issuing from the arc is projected with and forms part of the image, resulting in a blurred or indefinite picture. Secondly, the image of the lamp mechanism of such searchlight is also projected upon the image of the stencil and forms a dark spot therein. Thirdly, the use of the high intensity searchlight produces the problem of preventing burning or destruction of the stencil or object whose image is to be projected.

It is the principal object of my invention, therefore, to provide a projecting device for the purpose described capable of projecting an image at relatively great distances without projecting an image of the tail flame and which will be free of any dark spot or shadow caused by the lamp mechanism. It is also one of the principal objects of my invention to provide means for utilizing the intense beam of light of the high intensity searchlight without danger, however, of burning the object or stencil.

I am aware of the fact that large stereopticons for projecting pictures, stencils, etc. on clouds and buildings have been heretofore attempted. These devices have either projected large black mechanism images or, in order to avoid projecting a shadow from the lamp mechanism, such stereopticons have employed extra lenses in some suitable arrangement to obtain a clear image free from dark spots. Lenses, however, are very inefficient in gathering the light flux from the source of light and cannot be used successfully for cloud projectors, since sufficient light cannot be gathered to project over these great distances. Further, where such optical systems were used, it was necessary to place the object at the conjugate focus of the optical condenser, either lens or reflector, and the intense heat at the focal point rendered it impossible to maintain ordinary stencils at such point. Furthermore, the necessity for placing the object or stencil at the said focus made it necessary also to utilize a very small stencil or object for projection purposes. By my invention I am enabled to place the stencil or object at a point substantially removed from the said focus in a portion of the beam having a relatively large cross sectional area so that the specific intensity of the heat is not very great.

It is a further object of my invention to provide a projector of the type described wherein I may employ a standard searchlight, such as a 36" high intensity searchlight.

It is a further object of this invention to provide a projector of the type described, which includes a simple but efficient supporting structure for all of the necessary mechanism, said structure being capable of adjustment in azimuth and in elevation and providing also for adjustment of the objective lens with respect to the object or stencil and for adjustment of the source of light with respect to said object and said lens.

Other objects and advantages of this invention will be pointed out in the following detailed description thereof. My invention has certain features in common with the prior application of Elmer A. Sperry, Serial No. 750,695 for method and means for imparting intelligence, filed November 18, 1924, assigned to a common assignee, and therefore I wish it understood that certain broader aspects of the invention are covered in the said first filed application.

In the accompanying drawings,

Fig. 1 is a plan view of what I now consider to be the preferred embodiment of my invention.

Fig. 2 is a side elevation of the Fig. 1 device.

Fig. 3 is a section taken substantially on line 3—3 of Fig. 2 and disclosing the object or stencil holder.

Fig. 4 is a vertical section taken substantially on line 4—4 of Fig. 2 and disclosing the means for eliminating the tail flame from the projected image.

Fig. 5 is a diagrammatic respresentation disclosing the principles embodied in my invention.

Referring to Figs. 1 and 2 of the drawings, I have disclosed therein one embodiment of my invention. This may take the form of a carriage 10, preferably mounted for movement about a vertical axis upon base 11 by means such as anti-friction rollers 12. The carriage 10 may support for movement about a horizontal axis 13 a structure indicated generally at 14, comprising an open frame-work in which is mounted all of the essential elements of the distant projector. These elements may comprise a high intensity searchlight 15 mounted at one end of said frame 14 for movement about a horizontal axis 16, said searchlight being locked into position by any suitable locking means 17. The beam from said searchlight 15 is adapted to be thrown upon the object or stencil 18 and the image of said object may be passed through an objective lens 20 for imagining the stencil at a distance. The said objective lens 20 may be suitably mounted and is here shown as supported upon two parallel guide rods 21 slidable within suitable holders in frame 14 and movable toward and away from the searchlight 15 by any suitable driving means, such as handle 22 and suitable gearing 23 and cable 24. The frame 14 with all the mechanism carried thereby, including searchlight 15, the object or stencil 18, and the objective 20, may be swung about horizontal axis 13 by any suitable means such as handle 30 and segmental gear 31 meshing with a gear on the shaft of said handle 30.

Referring to the diagrammatic illustration of Fig. 5, it will be seen that the tail flame 35 issuing from the high intensity arc is itself projected as a fringe 36 outside the main beam cast by the searchlight reflector. It is quite apparent that placing of a cut-off device in the form of a member encircling the beam at any point removed from the conjugate focus C—F of the searchlight will not result in cutting off the image of the tail flame entirely but will cut off only a portion. This is clearly shown in Fig. 5 where the member 40 cuts off that portion of the tail flame image to the left of said member but the image picks up again on the right thereof. If, however, a cut-off member 41 is positioned to encircle the beam at the conjugate focus, that is, at the narrowest point of the beam, then the tail flame image is cut off completely and cannot possibly pick up again when the beam again diverges. It is for this purpose that the reflector 34 of the searchlight is caused to cast a beam which initially converges to a conjugate focus but later diverges, because it will be understood that the converging beam is in reality composed of a plurality of converging pencils of light, which after crossing the conjugate focus again diverge. The baffle member 41 may be in the form disclosed in Fig. 4 and comprise an ordinary board having an arcuate portion 45 of the same diameter as the beam at the conjugate focus. The said member 41 may be supported in a frame 46, said frame being preferably utilized also for supporting pulleys 47 over which the cables 24 for adjusting the position of the objective lens 20 may pass.

It will be seen that where the lamp mechanism, comprising the negative holder 50 and the positive holder 51, is positioned between the reflector 34 and the object 18, that the said lamp mechanism will itself cast a shadow indicated in Fig. 5 by the shadow bands 52 and 53. By causing the beam from the searchlight to converge rapidly, it is found that the said shadows 52—53 converge very rapidly and disappear at a point considerably before the conjugate focus is reached. I, therefore, utilize this fact to place the object or stencil 18 in the beam at a point just beyond the point of disappearance of said shadows 52 and 53. Since the beam at this point of positioning of the stencil is substantially free of shadow, the light passing through stencil 18 will be substantially clear light without dark spots and hence will throw an image of stencil 18 that is free of shadows or dark spots due to the lamp mechanism. It will be further apparent that I achieve a very great advantage in another respect by utilizing this fact that the shadows 52 and 53 disappear considerably in advance of the conjugate focus. This advantage is that I am thereby enabled to place the object or stencil 18 in a relative large cross sectional area of the beam with a consequent low beam or heat intensity so that the problem of protecting the stencil from the intense heat of the arc-light, which has always heretofore been present, is thus avoided. While the beam or heat intensity at the conjugate focus is so great that unless elaborate cooling means were employed the stencil would be destroyed, the heat intensity at the point where the object 18 is now positioned in my invention is so low that no cooling means need be employed, the heating being such as not to be uncomfortable even to the human hand. Such heat as may be developed at this point is, however, readily taken care of by the fact that frame-work 14 is entirely open to the atmosphere. By positioning the object or stencil fairly close to the reflector I also keep the overall length of the lamp within bounds for this enables me to position the objective lens 20 at not a too great distance away from the lamp and at the same time keep it at the proper distance from the object. It also enables me to place the objective lens in a spread portion of the beam beyond the focus of the reflector so that a large size objective lens may be employed capable of projecting a larger bundle of rays and also operating at a lower temperature than a small lens would operate placed near the conjugate focus.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A long-focus projector for projecting images of an object or stencil on clouds and the like, including a high intensity arc lamp producing an arc light having a tail flame, a reflector for reflecting a beam converging to a conjugate focus, the image of said tail flame being projected on the periphery of said beam, an objective lens beyond said focus for concentrating said beam, means positioned at said focus for cutting off said tail flame image and an object holder between said focus and the reflector at a wider point in the beam.

2. A long-focus projector for projecting images of an object or stencil on clouds and the like, including a high intensity arc lamp producing an arc light having a tail flame, a reflector for reflecting a beam converging to a conjugate focus, an object holder between said focus and reflector, the image of said tail flame being projected on the periphery of said beam, an objective lens beyond said focus for concentrating said beam, and means positioned at said focus and engaging the periphery of said beam for cutting off said tail flame image.

3. In a long-focus projector for projecting images of an object or stencil on clouds and the like, a support, a frame-work mounted thereon, a searchlight having arc lamp mechanism and a reflector and supported at one end of said frame-work, an objective lens mounted in the other end of said frame-work, said reflector normally reflecting a shadow of said lamp mechanism, said reflector being formed to reflect a beam converging to a conjugate focus and in which said shadow disappears in advance of said focus, and means carried by said frame-work at a point immediately beyond the point of disappearance of said shadow for supporting said object or stencil.

4. A long-focus projector for projecting images of an object or stencil on clouds and the like, including a high intensity arc lamp producing an arc light having a tail flame, a reflector for reflecting a beam converging to a conjugate focus, an object holder between said focus and reflector, the image of said tail flame being projected by said reflector, an objective lens and means interposed between said arc lamp and said lens and engaging the periphery of said beam at such point as to intercept said image and prevent transmission thereof through said lens.

5. In a long-focus projector for projecting images of an object or stencil on clouds and the like, in combination, a high intensity arc lamp producing an arc light having a tail flame, a reflector for said arc light, said reflector normally projecting an image of said tail flame, a stencil between said lamp and the conjugate focus of said reflector and means for preventing transmission of said tail frame image, comprising a member adjacent said stencil and a second member adjacent said conjugate focus.

6. In a long-focus projector for projecting images of an object or stencil on clouds and the like, in combination, a high intensity arc lamp producing an arc light having a tail flame, said lamp having electrode holders a reflector for said arc light, said reflector normally projecting images of said tail flame and said lamp, an object holder, an objective lens, means between the object holder and said lens for preventing transmission of said tail flame image to said lens, and means for preventing transmission of the image of the electrode holders.

7. In a long-focus projector for projecting images of an object or stencil on clouds and the like, in combination, an arc light mechanism, a reflector for said arc light, said reflector normally projecting a beam converging rapidly to a conjugate focus, said reflector projecting also an image of said lamp, said last-named image being eliminated by the convergence of said beam in advance of said focus, means for positioning said object or stencil at a point immediately beyond the point of elimination of said lamp image and a long focus objective lens positioned materially beyond said reflector focus.

8. In a long-focus projector for projecting images of an object or stencil on clouds and the like, in combination, an arc light mechanism, a reflector for said arc light, said reflector normally projecting a converging beam and an image of said lamp, said reflector being so formed as to eliminate said lamp image in advance of the point of minimum convergence of said beam, means for positioning said object or stencil at a point immediately beyond the point of elimination of said lamp image and in advance of the point of minimum convergence and a long focus objective lens positioned materially beyond said reflector focus.

9. In a long-focus projector for projecting images of an object or stencil on clouds and the like, a support mounted for movement about a vertical axis, an open frame-work mounted on said support for movement about a horizontal axis, a searchlight supported on one end of said frame-work, and adapted to produce a converging beam, said frame-work having means spaced from said searchlight for supporting said object or stencil between said searchlight and the conjugate focus of said beam, an objective lens mounted in the other end of said frame-work beyond said conjugate focus, and means mounted on said frame-work whereby said lens may be adjusted relative to said searchlight.

10. In a long focus projector for projecting images of an object or stencil on clouds and the like, a support mounted for movement about a vertical axis, an open frame-work mounted on said support for movement about a horizontal axis, a high intensity arc lamp supported on one end of said frame-work and producing an arc having a tail-flame, said frame-work having means spaced from said searchlight for supporting said object or stencil, an objective lens mounted in the other end of said frame-work, and means carried by said frame-work between said lens and said object for cutting off the tail flame image of the arc.

11. In a long-focus projector for projecting images of an object or stencil on clouds and the like, a support mounted for movement about a vertical axis, an open frame-work mounted on said support for movement about a horizontal axis, a high intensity arc lamp supported on one end of said frame-work and producing an arc having a tail flame, said frame-work having means spaced from said searchlight for supporting said object or stencil, said lamp comprising mechanism for producing a source of light, a reflector for said light, said reflector normally projecting a converging beam and an image of said mechanism, said source being so positioned with respect to said reflector as to eliminate said image in advance of the point of minimum convergence of said means, said object-supporting means being positioned beyond said point of minimum convergence, an objective lens mounted in the other end of said frame-work, and means carried by said frame-work for cutting off the tail flame image of the arc.

In testimony whereof I have affixed my signature.

PRESTON R. BASSETT.